March 30, 1965    M. W. COUTTS    3,175,595
BALED HOPS SHREDDER
Filed Feb. 14, 1963
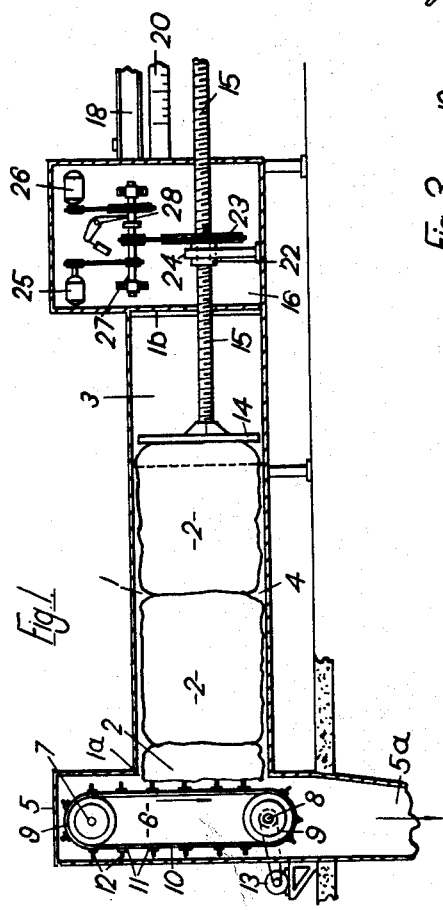
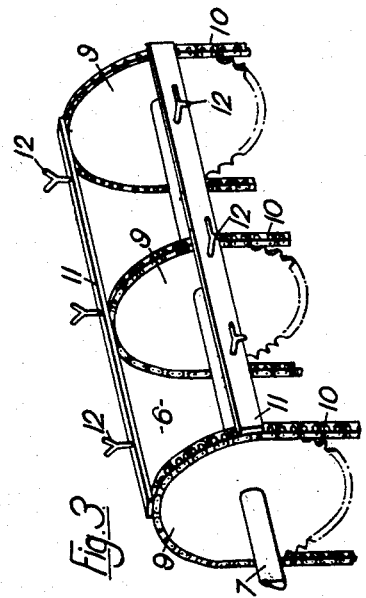
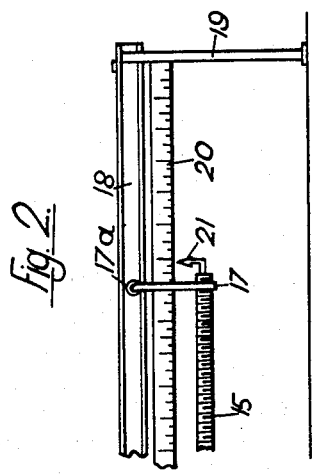
Inventor
MORTON WILLIAM COUTTS
By Irwin S. Thompson
Attorney

United States Patent Office 3,175,595
Patented Mar. 30, 1965

3,175,595
BALED HOPS SHREDDER
Morton William Coutts, Auckland, Auckland, New Zealand, assignor to Dominion Breweries Limited, Auckland, Auckland, New Zealand
Filed Feb. 14, 1963, Ser. No. 258,551
Claims priority, application New Zealand, Feb. 26, 1962, 131,469; Apr. 4, 1962, 131,769
1 Claim. (Cl. 146—70.1)

This invention relates to the breaking up and the measuring of compressed baled hops and the like, and has for its objects the provision of an apparatus for achieving this quickly and easily and also in measured quantities and at predetermined speeds and intervals of time, directly from the bales.

At present there is no known apparatus for achieving the objects of the present invention, hops being obtained in pressed bales, their covering means removed and the layers of hops peeled off and broken up by hand, weighed quantities being then placed in sacks.

The invention has been devised with a main object of breaking up or shredding baled compressed hops so that they are put into a suitable condition to be fed to a wort boiler in the production of wort for beer production purposes, a further object being to produce the shredded hops in a quick and easy manner and substantially automatically whereby measured quantities are obtainable.

Broadly the invention comprises improved apparatus for breaking up and measuring baled hops and the like comprising container means into which bales of compressed hops are adapted to be placed end to end in a row, tearing or shredding means being disposed at one end of the container towards which the bales of hops within the container are adapted to be moved, feed means being provided at the other end of the container for thrusting the row of bales of hops to the tearing or shredding means.

In describing the invention, reference will be made to the accompanying drawing in which:

FIGURE 1 is a partial sectional side elevation of the apparatus,
FIGURE 2 is a continuation of the apparatus of FIG. 1, and
FIGURE 3 shows a partial perspective view of the tearing or shredding mechanism.

In the invention, there is a horizontal box or bale holding container 1 which is suited for holding several bales of hops 2 therein, placed end to end, with moderate clearance around same, and as the bales 2 shown in the drawing are of square cross section, the container 1 is of rectangular form, although when bales are of cylindrical form the cross section of the container 1 for receiving same would preferably be cylindrical, such container 1 having an opening 3 through a wall 4 thereof through which the bales 2 are introduced into the container 1.

At the inner end 1a of the container 1 is an opening into an enclosing vertical casing 5 within which is housed the mechanism which effects the breaking up, tearing or shredding of the hops, with the lower part of the casing 5 so formed as to present a discharge or delivery chute 5a through which the shredded hops pass to the point of delivery.

The shredding mechanism 6 comprises upper and lower horizontal shafts 7 and 8 rotatably mounted in bearings (not shown) as may be carried by the casing 5, with two or more spaced-apart sprockets 9 secured to each shaft, and endless conveyor chains 10 passing over and between the sprockets 9 on the two shafts 7 and 8 in a known chain-conveyor-like manner, there being battens or bars 11 secured to the chains 10 at right angles across same.

These battens 11 have tearing fingers 12 secured thereto extending outwardly therefrom, the fingers 12 on the various battens 11 being arranged in staggered relationship so as to spread their action over the end face of a bale 2.

An electric motor 13 imparts power drive to the breaking up and shredding mechanism 6 in suitable manner, as through a clutch (not shown) to the lower shaft 8, to cause travel of the tearing fingers 12 in the direction as indicated by the arrow in FIG. 1, whereby they pass downward across the end face of a bale 2, and if so required, for safeguard purposes in the event of the fingers encountering some hard foreign body in a bale (such as a piece of wood or metal) safety or known centrifugal switch means (not shown) may be applied to a suitable point of the mechanism, such as the end of a shaft 7 or 8 to cause switching off of the electric motor 13 when the foreign body causes slowing down of the speed of travel of the fingers 12 to below normal.

For thrusting the bales 2 along the container 1 towards the fingers 12, there is a pusher plate 14 within the container 1 which is secured to an end of a long screw or threaded rod 15, this passing (with clearance) through a drive compartment 16 which is disposed beyond the outer end 1b of the container 1. At its outer end, rod 15 is supported by a carrying bar 17 which is secured thereto and which at its top has roller means 17a secured thereto adapted for travel along a horizontal support rail or beam 18 which extends from the compartment 16 to an outer support post 19.

Also extending horizontally between the compartment 16 and such support post 19, there is a graduated scale or gauge 20, the graduations of which may indicate feet and inches, or inches alone or some other measurements, and for use in conjunction with this gauge 20 there is preferably a pointer 21 which is secured to the end of the screw 15 and projects to near the bottom edge of the gauge 20.

The screw 15 is held against rotation and is engaged by an internally threaded boss 22, to which a main sprocket 23 is rigidly secured. The threaded boss 22 is rotatably carried by a supporting thrust block-bearing 24 which holds the boss 22 and its sprocket 23 against axial travel, the boss 22, sprocket 23 and thrust block-bearing 24 being located within the drive compartment 16.

It is necessary that the feed or travel of the pusher plate 14 be slow in speed when pushing the bales 2 along the container 1 while being operated on by the fingers 12, so that the time taken for travel of the pusher plate 14 from the outer end 1b to the inner end 1a of the container 1 is appreciable.

It is desirable to also have a reversible fast speed drive for the pusher plate 14 so that it can effect forward or backward travel quickly. Therefore, two drives are provided within the drive compartment 16 adapted to rotate the main sprocket 23, in the form of two electric motors 25 and 26, of which the motor 25 imparts reversible fast speed drive, while the motor 26 imparts the slow speed drive in one direction only, the drives being effected at different times.

Such drives can take various forms, but are preferably of positive type such as by use of sprockets and chains and may include a countershaft 27 and also a clutch 28 for the transmission of drive from one motor or the other, electrical safety mechanism (not shown) being applied in known manner to ensure that only one electric motor is in operation at the one time and to also ensure that the pusher plate 14 will not travel beyond permissible limits.

For one of the purposes of the present invention, the electric mechanism will include a resetting electric time clock (not shown) which can be set to cause the electric motor 26 to impart its drive at set intervals of time.

There are occasions when it is desirable to blend two or more types of hops in certain proportions and obviously there could then be two or more machines as described each for effecting the treatment of a type of hops.

Instead of having completely separate machines however, they couldl be of a combined form, as for instance, there could be two or more separate containers 1 disposed side by side or one above the other, each with their own separate screws 15 and drives therefor as described, but with only one tearing or shredding mechanism 6 which is enlarged in width or in height as required to effect the treatment of bales 2 from the separate containers 1, the shredded hops being discharged from the one delivery chute 5a.

While the drawing shows an apparatus of a length of container 1 suited for containing three bales of hops 2, it will be obvious that the length of such container 1 may be used for containing more or less than the three bales.

In use or operation, with the pusher plate 14 disposed at the outer end 1b of the container 1, the opening 3 is clear for the entry of bales thereto, these bales 2 being compressed hops from which the outer coverings have been removed.

The motor 25 is used in the chamber loading operation, and with a bale entered through the opening 3, such bale 2 is pushed along the container, clear of the opening, and upon the pusher plate 14 being retracted, a second bale is introduced into the chamber and pushed along same, and in similar manner the third bale is introduced whereby the container holds its capacity, the first bale having its end face in the vicinity of the inner end 1a of the container 1, ready to be pushed into contact with the tearing fingers 12.

When the motor 13 is switched on and then the motor 26 also switched on, the fingers 12 will be travelling in the direction as indicated by the arrow in FIG. 1 and the bales 2 will be successively thrust against the fingers 12.

The motor 26 in operation imparts slow speed rotation to the main sprocket 23 and through same to the threaded boss 22 whereby the pusher plate 14 is moved by the screw 15 towards the tearing and shredding mechanism 6, thrusting the row of bales 2 ahead of it to feed the bales to the fingers 12.

The result is that the fingers 12 tear off the pressed hops and the shredded hops fall down the delivery chute 5a of the casing, whereby if the three bales within the container are so treated, the weight of shredded hops is the same as when in the compressed state in the three bales.

In some situations, the operation as described may be all that is required, the hops in the broken up, separated and shredded state being used as and when so required, or they may be bagged and stored, ready for processing as required.

It being known that the pusher plate 14 will travel under the slow speed drive of the motor 26 a certain number of inches per minute, and also that the total length of a number of bales 2 placed end to end within the container 1 represents the total known weight of compressed hops in the container, it can be calculated that a certain weight of hops can be delivered through the chute 5a during a certain running time of the machine, the weight of each bale being known before being placed in the container 1, and this is the use to which the gauge 20 is put.

Therefore when bales 2 have been put into the container 1 and are pushed towards the fingers 12 so that the end face of the bale nearest to same is just touching the fingers 12, a reading is taken of the point on the gauge or scale 20 where the pointer is pointing. Such reading, which could be (for instance) 90 inches, represents the length occupied by the known weight which could be, for instance, 900 lbs.

Therefore with each inch of length on the scale 20 representing 10 lbs. weight of hops and the speed of travel of the pusher plate 14 being for example 1 inch per minute, for 15 lbs. of the shredded hops to be produced, the time clock would be set to give an operating time of 1½ minutes.

The time clock may also be set to effect the starting and stopping and running period at predetermined times, the shredded hops being delivered directly to an intermittent or continuous wort boiling system in batches or in a continuous stream.

I claim:

Apparatus for breaking up baled material, comprising endless conveyor means including a plurality of parallel endless drive members, spaced crossbars parallel to each other and extending transversely of and interconnecting and disposed outwardly of and overlying and fixedly secured to the endless drive members, a plurality of spaced shredding elements disposed along and fixedly secured to and extending outwardly of each crossbar, the conveyor means being vertically elongated, bale feeding means comprising a container defining a substantially horizontal bale chute so positioned that bales moving along the chute contact the conveyor means between the ends of the conveyor means, means for advancing bales along the chute, the bale advancing means comprising a pusher member, an elongated screw on one end of which the pusher member is mounted, the screw bearing against the rear of a central portion of the pusher member, a rotatable internally screw-threaded collar in which the screw is engaged, means fixing the collar against axial movement, a first power means drivingly connected with the collar through first gear means of relatively large gear ratio to drive the collar to advance the screw and pusher member toward the shredding means at a relatively slow speed, a second power means drivingly connected with the collar through second gear means of relatively small gear ratio to drive the collar to retract the screw and pusher member from the shredding means at a relatively high speed, a clutch means for selectively engaging either of said first and second power means, indicator means extending lengthwise of the path of travel of the screw, and means carried by the end of the screw remote from said pusher member and registering with the indicator means for indicating the amount of movement of the screw.

References Cited by the Examiner

UNITED STATES PATENTS

| 47,131 | 4/65 | Ritterhoff et al. |
| 672,519 | 4/01 | Anderson. |
| 1,026,273 | 5/12 | Malmsten et al. |
| 1,165,523 | 12/15 | Lyle. |
| 1,207,055 | 12/16 | Keogh _____ 144—187 |
| 1,305,484 | 6/19 | Mosca. |
| 2,742,801 | 4/56 | Opocensky et al. _____ 77—63 |

FOREIGN PATENTS

| 528,821 | 8/56 | Canada. |

J. SPENCER OVERHOLSER, *Primary Examiner.*